(12) United States Patent
Merchant et al.

(10) Patent No.: US 8,305,082 B2
(45) Date of Patent: Nov. 6, 2012

(54) CALIBRATION OF XX, YY AND ZZ INDUCTION TOOL MEASUREMENTS

(75) Inventors: Gulamabbas Merchant, Houston, TX (US); Luis M. Pelegri, Humble, TX (US); Vladimir S. Mogilatov, Novosibirsk (RU)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/609,997

(22) Filed: Dec. 13, 2006

(65) Prior Publication Data

US 2007/0115000 A1    May 24, 2007

Related U.S. Application Data

(63) Continuation-in-part of application No. 11/081,958, filed on Mar. 16, 2005.

(51) Int. Cl.
*G01V 3/10* (2006.01)
*G01V 3/18* (2006.01)
*G01V 3/16* (2006.01)

(52) U.S. Cl. ............. 324/343; 324/330; 324/202; 702/7

(58) Field of Classification Search .................. 324/330, 324/202, 333–343, 346, 351, 352, 353, 355, 324/356, 366, 368; 702/7
See application file for complete search history.

(56) References Cited

U.S. PATENT DOCUMENTS

| 4,837,517 | A | 6/1989 | Barber .......................... 324/339 |
| 5,157,605 | A | 10/1992 | Chandler et al. .............. 364/422 |
| 5,293,128 | A | 3/1994 | Zhou .............................. 324/339 |
| 5,452,761 | A | 9/1995 | Beard et al. ................... 166/250 |
| 5,542,761 | A | 8/1996 | Dedoes .......................... 366/198 |
| 5,600,246 | A | 2/1997 | Forgang et al. ............... 324/339 |
| 5,781,436 | A | 7/1998 | Forgang et al. ............... 364/422 |
| 5,884,227 | A | 3/1999 | Rabinovich et al. .............. 702/7 |
| 5,999,883 | A | 12/1999 | Gupta et al. ....................... 702/7 |
| 6,586,939 | B1 | 7/2003 | Fanini et al. |
| 6,900,640 | B2* | 5/2005 | Fanini et al. .................. 324/339 |
| 2003/0028324 | A1* | 2/2003 | Xiao et al. ......................... 702/7 |
| 2003/0076107 | A1* | 4/2003 | Fanini et al. ................... 324/339 |
| 2004/0113609 | A1* | 6/2004 | Homan et al. ................. 324/202 |
| 2005/0088181 | A1* | 4/2005 | Barber et al. ................. 324/346 |
| 2005/0143920 | A1* | 6/2005 | Barber et al. ..................... 702/7 |

(Continued)

FOREIGN PATENT DOCUMENTS

WO    WO98/00733    1/1998

OTHER PUBLICATIONS

J.H. Moran et al.; *Basic Theory of Induction Logging and Application to Study of Two-Coil Sondes*, Geophysics, vol. XXVII, No. 6, Part 1 (Dec. 1962), pp. 829-858.

(Continued)

*Primary Examiner* — Patrick Assouad
*Assistant Examiner* — David M. Schindler
(74) *Attorney, Agent, or Firm* — Mossman Kumar & Tyler PC

(57) ABSTRACT

Measurements made with a multicomponent logging system oriented in a horizontal position above the surface of the earth must satisfy certain relationships. These relationships are used to establish calibration errors in the system.

13 Claims, 4 Drawing Sheets

U.S. PATENT DOCUMENTS

| | | | |
|---|---|---|---|
| 2005/0156601 A1* | 7/2005 | Dupuis et al. | 324/330 |
| 2006/0132138 A1 | 6/2006 | Pelegri et al. | 324/339 |
| 2006/0164092 A1 | 7/2006 | Forgang et al. | 324/339 |
| 2006/0192562 A1 | 8/2006 | Davydychev et al. | 324/339 |
| 2006/0208737 A1 | 9/2006 | Merchant et al. | 324/330 |
| 2007/0103160 A1 | 5/2007 | Pelegri | 324/339 |

OTHER PUBLICATIONS

J.H. Moran et al.; *Basic Theory of Induction Logging and Application to Study of Two-Coil Sondes*, Geophysics, vol. XXVII, No. 6, Party 1 (Dec. 1962), pp. 829-858.

* cited by examiner

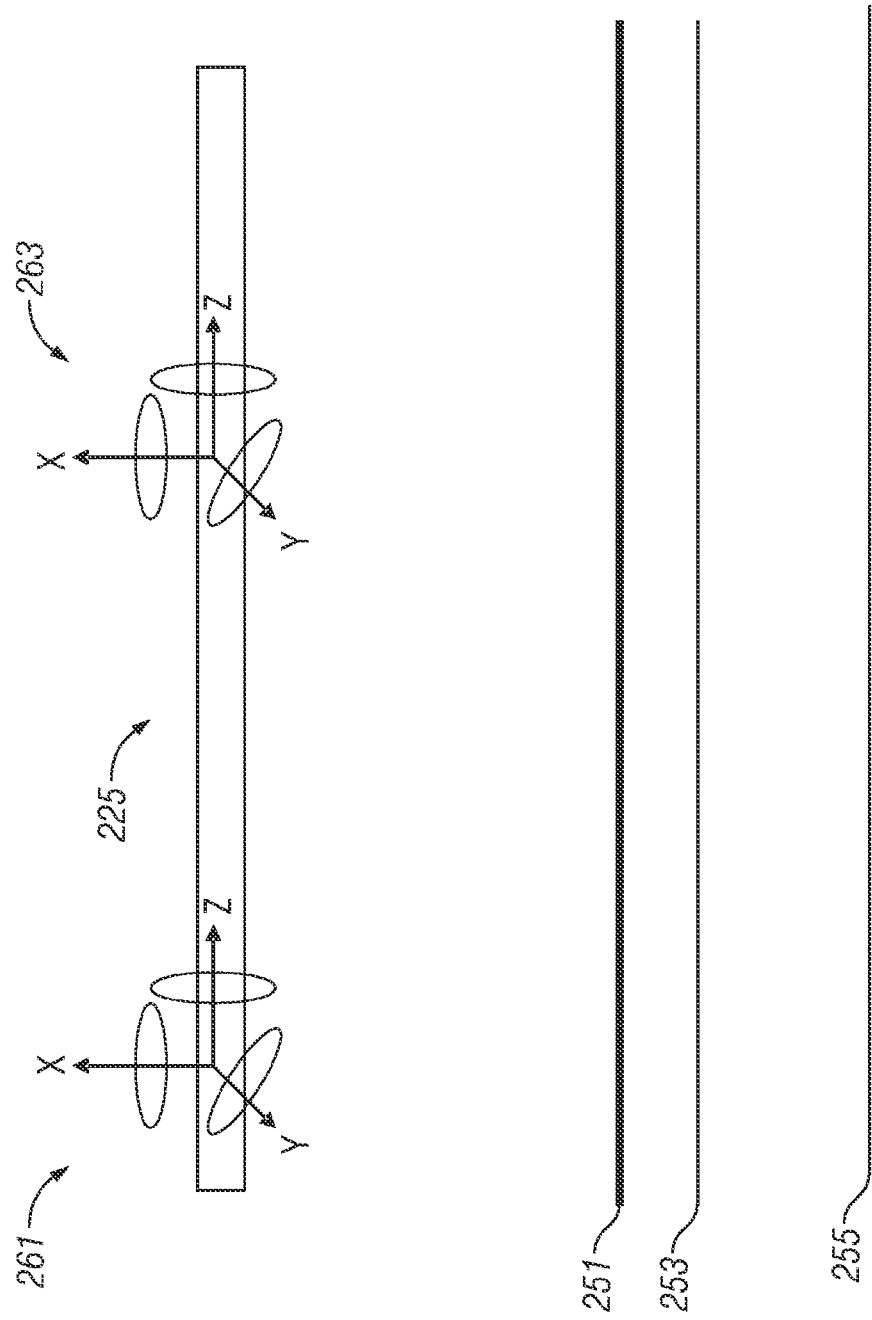

CALIBRATION OF XX, YY AND ZZ INDUCTION TOOL MEASUREMENTS

CROSS REFERENCES TO RELATED APPLICATIONS

This application is a continuation-in-part of U.S. patent application Ser. No. 11/081,958 filed on 16 Mar. 2005.

BACKGROUND OF THE INVENTION

1. Field of the Invention

The invention is related generally to the field of transverse electromagnetic induction measurements wherein the multicomponent measurements are made with antennas that may be transversely inclined to one another. The method is applicable for both well logging operations and for airborne electromagnetic measurements.

2. Description of the Related Art

Electromagnetic induction resistivity well logging instruments are well known in the art. Electromagnetic induction resistivity well logging instruments are used to determine the electrical conductivity, and its converse, resistivity, of earth formations penetrated by a borehole. Formation conductivity has been determined based on results of measuring the magnetic field of eddy currents that the instrument induces in the formation adjoining the borehole. The electrical conductivity is used for, among other reasons, inferring the fluid content of the earth formations. Typically, lower conductivity (higher resistivity) is associated with hydrocarbon-bearing earth formations. The physical principles of electromagnetic induction well logging are well described, for example, in, J. H. Moran and K. S. Kunz, Basic Theory of Induction Logging and Application to Study of Two-Coil Sondes, Geophysics, vol. 27, No. 6, part 1, pp. 829-858, Society of Exploration Geophysicists, December 1962. Many improvements and modifications to electromagnetic induction resistivity instruments described in the Moran and Kunz reference, supra, have been devised, some of which are described, for example, in U.S. Pat. No. 4,837,517 issued to Barber, in U.S. Pat. No. 5,157,605 issued to Chandler et al and in U.S. Pat. No. 5,600,246 issued to Fanini et al.

The conventional geophysical induction resistivity well logging tool is a probe suitable for lowering into the borehole and it comprises a sensor section containing a transmitter and receiver and other, primarily electrical, equipment for measuring data to infer the physical parameters that characterize the formation. The sensor section, or mandrel, comprises induction transmitters and receivers positioned along the instrument axis, arranged in the order according to particular instrument or tool specifications and oriented parallel with the borehole axis. The electrical equipment generates an electrical voltage to be further applied to a transmitter induction coil, conditions signals coming from receiver induction coils, processes the acquired information, stores or by means of telemetry sending the data to the earth surface through a wire line cable used to lower the tool into the borehole.

Conventional induction well logging techniques employ coils wound on an insulating mandrel. One or more transmitter coils are energized by an alternating current. The oscillating magnetic field produced by this arrangement results in the induction of currents in the formations which are nearly proportional to the conductivity of the formations. These currents, in turn, contribute to the voltage induced in one or more receiver coils. By selecting only the voltage component which is in phase with the transmitter current, a signal is obtained that is approximately proportional to the formation conductivity. In conventional induction logging apparatus, the basic transmitter coil and receiver coil has axes which are aligned with the longitudinal axis of the well logging device. (For simplicity of explanation, it will be assumed that the borehole axis is aligned with the axis of the logging device, and that these are both in the vertical direction. Also single coils will subsequently be referred to without regard for focusing coils or the like.) This arrangement tends to induce secondary current loops in the formations that are concentric with the vertically oriented transmitting and receiving coils. The resultant conductivity measurements are indicative of the horizontal conductivity (or resistivity) of the surrounding formations. There are, however, various formations encountered in well logging which have a conductivity that is anisotropic. Anisotropy results from the manner in which formation beds were deposited by nature. For example, "uniaxial anisotropy" is characterized by a difference between the horizontal conductivity, in a plane parallel to the bedding plane, and the vertical conductivity, in a direction perpendicular to the bedding plane. When there is no bedding dip, horizontal resistivity can be considered to be in the plane perpendicular to the bore hole, and the vertical resistivity in the direction parallel to the bore hole. Conventional induction logging devices, which tend to be sensitive only to the horizontal conductivity of the formations, do not provide a measure of vertical conductivity or of anisotropy. Techniques have been developed to determine formation anisotropy.

Thus, in a vertical borehole, in a clastic sedimentary sequence, a conventional induction logging tool with transmitters and receivers (induction coils) oriented only along the borehole axis responds to the average horizontal conductivity that combines the conductivity of both sands and shales. These average readings are usually dominated by the relatively higher conductivity of the shale layers and exhibit reduced sensitivity to the lower conductivity sand layers where hydrocarbon reserves are produced. To address this problem, loggers have turned to using transverse induction logging tools having magnetic transmitters and receivers (induction coils) oriented transversely with respect to the tool longitudinal axis. Such instruments for transverse induction well logging has been described in PCT Patent publication WO 98/00733 of Beard et al. and U.S. Pat. No. 5,452,761 to Beard et al.; U.S. Pat. No. 5,999,883 to Gupta et al.; and U.S. Pat. No. 5,781,436 to Forgang et al.

One difficulty in interpreting the data acquired by a transversal induction logging tool is associated with vulnerability of its response to borehole conditions. Among these conditions is the presence of a conductive well fluid as well as wellbore fluid invasion effects. A known method for reducing these unwanted impacts on the transversal induction logging tool response was disclosed in L. A. Tabarovsky and M. I. Epov, Geometric and Frequency Focusing in Exploration of Anisotropic Seams, Nauka, USSR Academy of Science, Siberian Division, Novosibirsk, pp. 67-129 (1972) and L. A. Tabarovsky and M. I. Epov, Radial Characteristics Of Induction Focusing Probes With Transverse Detectors In An Anisotropic Medium, Soviet Geology And Geophysics, 20 (1979), pp. 81-90.

There are a few hardware margins and software limitations that impact a conventional transversal induction logging tool performance and result in errors appearing in the acquired data. The general hardware problem is typically associated with an unavoidable electrical field that is irradiated by the tool induction transmitter simultaneously with the desirable magnetic field, and it happens in agreement with Maxwell's equations for the time varying field. The transmitter electrical field interacts with remaining modules of the induction logging tool and with the formation; however, this interaction does not produce any useful information. Indeed, due to the always-existing possibility for this field to be coupled directly into the receiver part of the sensor section through parasitic displacement currents, it introduces the noise. When this coupling occurs, the electrical field develops undesirable electrical potentials at the input of the receiver signal conditioning, primarily across the induction coil receiver, and this voltage becomes an additive noise component to the signal of interest introducing a systematic error to the measurements.

Reduction of noise is of paramount importance, and a hardware solution to the problem is taught in U.S. Pat. No. 6,586,939 to Fanini et al, having the same assignee as the present invention and the contents of which are fully incorporated herein by reference. Proper correction is necessary in order to obtain meaningful interpretations of multicomponent induction logging data.

Multicomponent EM measurements are also now being used in airborne applications. As discussed in Smith et al., time-domain airborne electromagnetic (AEM) systems historically measure the inline horizontal (x) component. New versions of the electromagnetic systems are designed to collect two additional components [the vertical (z) component and the lateral horizontal (y) component] to provide greater diagnostic information. An example of such a system is shown in FIG. 3. This is illustrative of the GEOTEM®, an aeromagnetic survey system of Fugro Airborne Surveys Corp. Shown therein is a fixed wing aircraft 201 carrying a transmitter loop antenna 207 and a towed three component sensor 203 above the earth 205. Other configurations using helicopter borne sensors also exist. As discussed in Smith, measurements may be made with the transmitter in different source orientations.

In areas where the geology is near horizontal, the z-component response provides greater signal-to-noise, particularly at late delay times. This allows the conductivity to be determined to greater depth. In a layered environment, the symmetry implies that the y component will be zero; hence a nonzero y component will indicate a lateral inhomogeneity. The extent of contamination of the y component by the x and z components can be used to ascertain the strike direction and the lateral offset of the target, respectively. Having the z and y component data increases the total response when the profile line has not traversed the target. This increases the possibility of detecting a target located between adjacent flight lines or beyond a survey boundary.

Hardware solutions of the type discussed by Fanini et al. are not practical for airborne systems where the transmitter and receiver are spatially separated. Even for transverse induction logging instruments such as the 3DEX™ multicomponent logging tool of Baker Hughes Incorporated, it would be desirable to have an independent assessment of the calibration of the different components of multicomponent measurements. The present invention addresses this need.

SUMMARY OF THE INVENTION

One embodiment of the invention is a method of using a system having at least one transmitter and at least one receiver for making multicomponent induction measurements. The method includes positioning the system above the surface of the earth, orienting the system so that an axis of one of the at least one transmitter and the at least one receiver is substantially parallel to the surface and substantially collinear with an axis of the other of the at least one transmitter and the at least one receiver. Multicomponent measurements are obtained at least one frequency and at least one rotational angle of the system. An indication of the calibration error in at least one of the multicomponent measurements is determined. Determining the indication of calibration error may use a distance between the at least one transmitter and the at least one receiver. The system may be adapted for borehole use and the at least one transmitter may include three transmitters substantially orthogonal to each other.

Another embodiment of this invention is a system for making multicomponent induction measurements. The system includes at least one transmitter and at least one receiver configured to make multicomponent measurements at least one frequency and at least one rotational angle. The system further includes a processor configured to determine from the multicomponent measurements made at a substantially horizontal configuration of the system an indication of the calibration error in at least one of the multicomponent measurements. The processor may be further configured to determine the indication of calibration had a using a distance between the at least one transmitter and the at least one receiver.

Another embodiment of the invention is machine readable medium for use with a system used for evaluating an earth formation. The system includes at least one transmitter and at least one receiver on a logging tool configured to make multicomponent induction measurements with the logging tool oriented in a direction substantially parallel to a surface of the earth. The medium includes instructions which enable a processor to determine from the multicomponent measurements an indication of the calibration error in at least one of the multicomponent measurements. The machine readable medium may include ROMs, EPROMs, EAROMs, Flash Memories and Optical disks.

Another embodiment of the invention is a method of using a logging tool having at least one transmitter and at least one receiver for making multicomponent induction measurements. The method includes positioning the logging tool above the surface of the earth with the longitudinal axis of the tool substantially parallel to the surface. The method further comprises obtaining multicomponent measurements at least one rotational angle of the tool, rotating the multicomponent measurements to give rotated components in a tool coordinate system, and determining from the rotated components an indication of the calibration error in at least one of the multicomponent measurements.

Another embodiment of the invention is a system for making multicomponent measurements. The system includes at least one transmitter and at least one receiver on a logging tool position above the surface of the earth with the longitudinal axis of the tool substantially parallel to the surface. The at least one transmitter and the at least one receiver are configured to make multicomponent measurements at least one frequency and at least one rotational angle. The system further includes a processor configured to rotate the multicomponent measurements to give rotated components in a tool coordinate system, and determine from the multicomponent measurements made at a substantially horizontal configuration of the system an indication of the calibration error in a least one of the measurements.

BRIEF DESCRIPTION OF THE DRAWINGS

The invention is best understood by reference to the accompanying figures wherein like numbers refer to like components and in which:

FIG. 4 shows a logging tool oriented parallel to the surface of the earth as needed for calibration according to the method of the present invention.

DETAILED DESCRIPTION OF THE INVENTION

Figure 1:
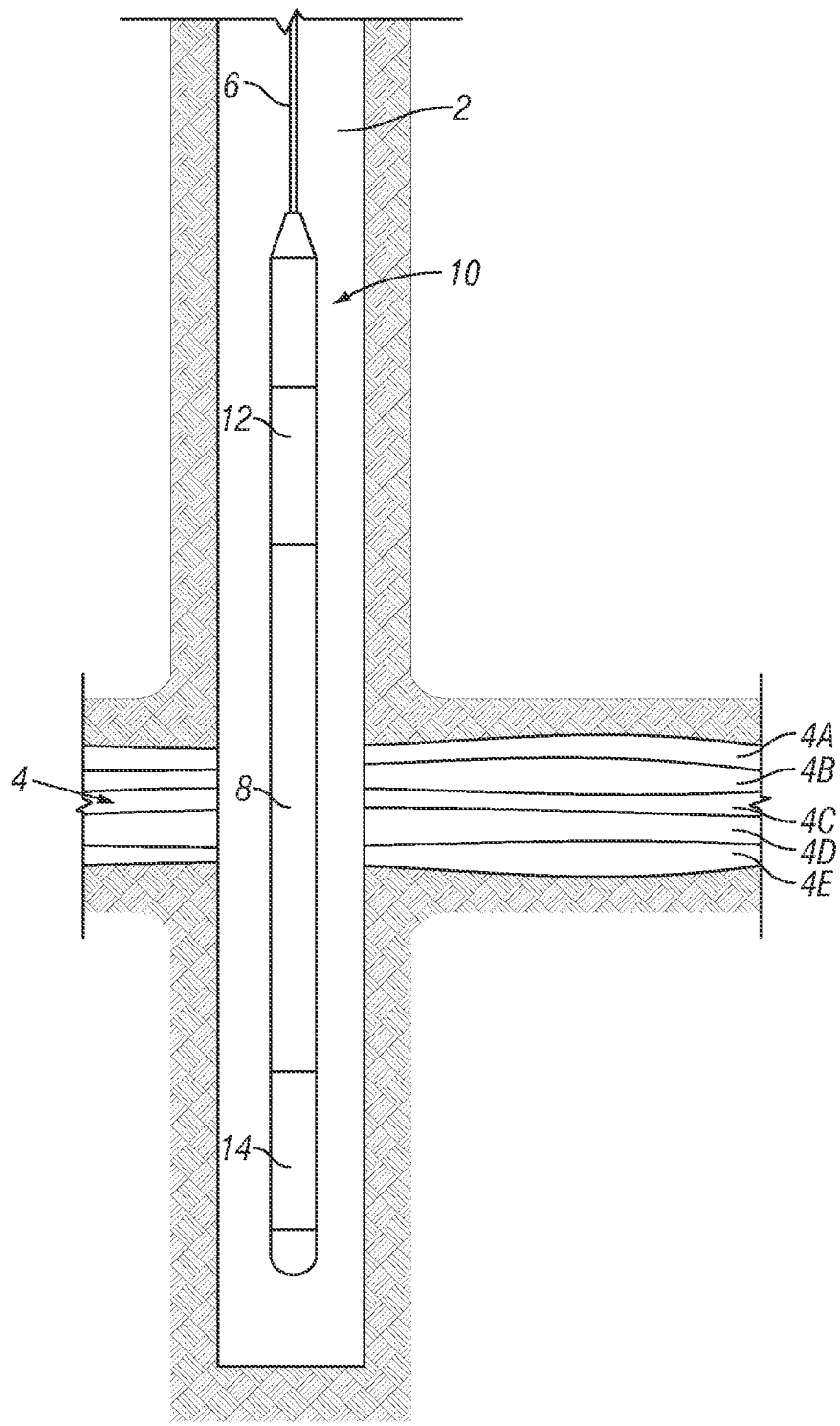
FIG. 1 (Prior Art) shows an induction instrument disposed in a wellbore penetrating earth formations.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by means of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 2:
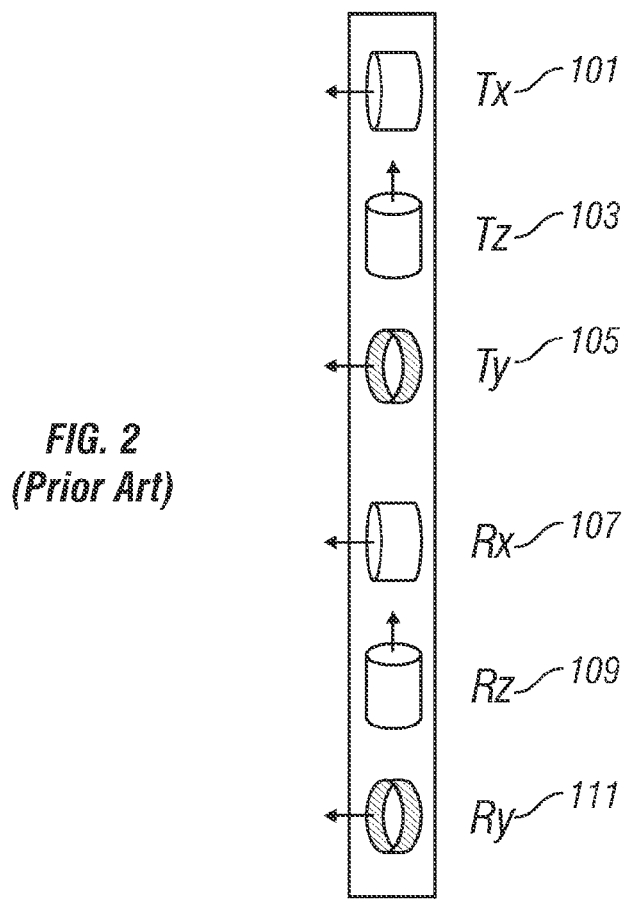
FIG. 2 (Prior Art) shows the arrangement of transmitter and receiver coils in the multicomponent induction logging tool marketed under the name 3DEX™.

Referring to FIG. 2, the configuration of transmitter and receiver coils in a preferred embodiment of the 3DEX™ multicomponent induction logging instrument of Baker Hughes is shown. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields. In one mode of operation of the tool, the $H_{xx}$, $H_{yy}$, $H_{zz}$, $H_{xy}$, and $H_{xz}$ components are measured, though other components may also be used.

The method of the present invention is based upon measuring the different components of the induced magnetic field with the logging tool in a position parallel to the surface of the earth. For the airborne EM system, this is requires some modification of the apparatus shown in FIG. 3. The body of the three-component sensor 203 would be provided with aerofoils that produce sufficient lift so that the receivers are at the same elevation as the transmitters. For a logging tool, this configuration is illustrated in FIG. 4 where the tool 225 is positioned in air parallel to the surface of the earth. The surface of the earth is denoted by 251 and boundaries of layers of the earth are indicated by 253, 255 etc. Also indicated are a three-component transmitter 261 and a three component receiver 263 with x, y and z coils as indicated. The air has, for all practical purposes, a conductivity σ=0, while the earth layers have conductivity σ≠0.

When the x-axis is vertical, certain relationships exist between the different components of a triaxial tool. The tool is positioned in air parallel to the surface of the earth at a height of $h_s$. The earth is considered to be horizontally layered. The conductivity of each layer can be arbitrary and there may be anisotropy present. The figure shows only one triaxial transmitter array and one tri-axial receiver array. In a tool like the 3DEX™ logging tool, there are two transmitter arrays at different spacing from the receiver and with moments such that the signal in air far from any objects or earth is zero. In the case considered here, the distance $h_s$ is small enough so that there is influence of the earth. The orientation of the array is such that the X-coils face towards the earth, the Y-coils and Z-coils are parallel to the surface of the earth as shown in the figure.

Let the transmitter magnetic moments for the X, Y and Z transmitters be $M_x$, $M_y$ and $M_z$ respectively. Initially, let $\sigma_{AIR} = \sigma_0 \neq 0$. Then, the magnetic field in the receivers X, Y and Z due to transmitter X, Y and Z respectively are $H_{xx}$, $H_{yy}$ and $H_{zz}$. The response can be obtained as a solution to Maxwell's Equations. Assuming all the magnetic moments are equal to unity, the results can be expressed as the integrals:

$$H_{xx} = \int_0^\infty \frac{\zeta^3}{\beta}(e^{-\beta|z-z_s|} + R_0 e^{-\beta(z_0-z+h_s)})J_0(\zeta x)d\zeta \tag{1}$$

where $R_0$ is the reflection coefficient for the interface between air and layered earth;

$\zeta$ is the variable of integration;

$$\beta = \sqrt{\zeta^2 - k_0^2};$$

$$k_o = \sqrt{\omega\mu_o\sigma_0};$$

$\sigma_0$=Conductivity of the layer in which the tool is located. For Air $\sigma_0$=0;

$\mu_0$=Magnetic Permeability of the layer in which the tool is located;

$\omega$=2 πf;

f=transmitter frequency;

z=Z location of receiver;

$z_s$=Z location of transmitter;

$h_s$=distance of receiver above layer boundary;

$z_0$=Z location of the layer boundary;

$J_0$=Bessel function of the first kind of order zero;

$J_1$=Bessel function of the first kind of order one;

Using $\sigma_0$=0, $k_0$=0, and $\beta$=ξ we can simplify $H_{xx}$ to $$H_{xx} = \int_0^\infty \xi^2(e^{-\xi|z-z_s|} + R_0 e^{-\xi(z_0-z+h_s)})J_0(\zeta x)d\zeta. \tag{2}$$

Similarly $$H_{zz} = \int_0^\infty \zeta^2 (-e^{-\zeta|z-z_s|} + R_0 e^{-\zeta(z_0-z+h_s)})\left(J_0 - \frac{J_1}{\zeta^2}\right)d\zeta \quad (3)$$

$$H_{yy} = \int_0^\infty (-e^{-\zeta|z-z_s|} + R_0 e^{-\zeta(z_0-z+h_s)})J_1 d\zeta. \quad (4)$$

Hence $$H_{zz} + H_{yy} = \int_0^\infty \zeta^2 (-e^{-\zeta|z-z_s|} + R_0 e^{-\zeta(z_0-z+h_s)})J_0 d\zeta. \quad (5)$$

Taking the difference of above sum with the expression for $H_{xx}$ we get $$H_{xx} - (H_{zz} + H_{yy}) = 2\int_0^\infty \zeta^2 e^{-\zeta|z-z_s|} J_0(\zeta x)d\zeta \quad (6)$$

$$= \frac{2}{R^3}\left(2 - 3\frac{x^2}{R^2}\right).$$

where x is the spacing between transmitter and receiver, $R=\sqrt{x^2+(z-z_s)^2}$. For a tool oriented parallel to the surface of the earth, $x=L$, and $z=z_s$. Hence $$H_{xx} - (H_{zz} + H_{yy}) = \frac{-2}{L^3}. \quad (7)$$

As mentioned before, in a tri-axial tool, the measurement is done using a single transmitter with two receivers with their moments such that the magnetic field is canceled in air far from earth. Assuming the moments of the two receivers are $M_1$ and $M_2$ and the corresponding spacings are $L_1$ and $L_2$, the above expression becomes:

$$H_{xx} - (H_{zz} + H_{yy}) = -2\left(\frac{M_1}{L_1^3} - \frac{M_2}{L_2^3}\right) = 0. \quad (8)$$

The preceding expression is the result of the fact that the measurements in air cancel. If we have the situation that the measurements are made with a single receiver and two transmitters with their moments canceling the receiver magnetic field in air then by reciprocity, the above result is still valid. Hence, $$H_{xx} = H_{zz} + H_{yy}. \quad (9)$$

It should be noted that the above result is valid for collocated or equally spaced coils. The array is parallel to the surface or and the axis of the X coils is parallel to the normal to the earth surface. In terms of apparent conductivities, the above relation becomes:

$$\sigma_{xx} = 2\sigma_{zz} + \sigma_{yy}. \quad (10)$$

The factor of 2 is due to the different tool constants used to convert the Z-component to conductivity as opposed the one used for X or Y component.

Various consequences of the eqn. (9) can also be derived. Consider the case when the tool is rotated around its axis. The corresponding measurements can be expressed in terms of the primary measurements at no rotation as follows:

$$\hat{H}_{xx} = \cos^2(\phi)H_{xx} + \sin^2(\phi)H_{yy}, \quad (11)$$

$$\hat{H}_{yy} = \sin^2(\phi)H_{xx} + \cos^2(\phi)H_{yy}, \quad (12)$$

$$\hat{H}_{zz} = H_{zz}. \quad (13)$$

where $\phi$ is the angle of rotation of X-axis around Z-axis. When we compute an expression similar to eq. (8), we get:

$$\hat{H}_{xx} - (\hat{H}_{zz} + \hat{H}_{yy}) = \cos^2(\phi)(H_{xx} - H_{zz} - H_{yy}) + \quad (14)$$
$$\sin^2(\phi)(H_{yy} - H_{zz} - H_{xx})$$
$$= -2\sin^2(\phi)H_{zz}$$

The corresponding apparent conductive relation is:

$$\hat{\sigma}_{xx} - (2\hat{\sigma}_{zz} + \hat{\sigma}_{yy}) = -4\sin^2(\phi)\sigma_{zz}. \quad (15)$$

Similarly, for cross component measurement:

$$\hat{H}_{xy} = \frac{1}{2}\sin(2\phi)(H_{yy} - H_{xx}) \quad (16)$$
$$= -\frac{1}{2}\sin(2\phi)H_{zz}$$

and $$\hat{\sigma}_{xy} = -\sin(2\phi)\sigma_{zz}. \quad (17)$$

In reality, it is not practical to have the x-, y- and z-coils for the transmitter (and the receiver) co-located, i.e., at the same spatial position. For non-co-located coils, eqn. (17) is also approximately correct for multifrequency focused signals. Multifrequency focusing is discussed in U.S. Pat. No. 5,884,227 to Rabinovich et al., having the same assignee as the present invention and the contents of which are incorporated herein by reference. The method includes extrapolating magnitudes of the receiver signals at a plurality of frequencies to a response which would be obtained at zero frequency. In one embodiment of the invention, at least one of eqns. (10) and (17) is used as a consistency check on the calibration achieved by the hardware such as that disclosed in Fanini.

Additional relations exist that can be used for checking the consistency of the different components of measurements. With the tool in the orientation shown in FIG. 4, the measurements of the magnetic field components may be denoted by:

$$\tilde{H}_{xx} = H_{xx} + \delta_{xx}$$

$$\tilde{H}_{yy} = H_{yy} + \delta_{yy}$$

$$\tilde{H}_{zz} = H_{zz} + \delta_{zz} \quad (18),$$

where $\delta_{xx}$, $\delta_{yy}$, and $\delta_{zz}$ are the respective errors in the measurements made of the corresponding components. From eqn. (4) it follows that $$P_1 = \tilde{H}_{zz} + \tilde{H}_{yy} - \tilde{H}_{xx} \quad (19)$$
$$= H_{zz} + H_{yy} - H_{xx} + \delta_{zz} + \delta_{yy} - \delta_{xx}$$
$$= \delta_{zz} + \delta_{yy} - \delta_{xx}.$$

Generally, it is easier to achieve calibration of the z-coils. Calibration of the z-coils is discussed, for example, in U.S. Pat. No. 5,293,128 to Zhou et al., having the same assignee as the present invention and the contents of which are fully incorporated herein by reference. If it is assumed that the zz measurements are properly calibrated, then eqn. (19) gives an indication of the relative error between the xx and yy measurements. If the zz measurements are not assumed to be properly calibrated, then it is possible to determine the calibration error in the zz measurements.

Figure 3:
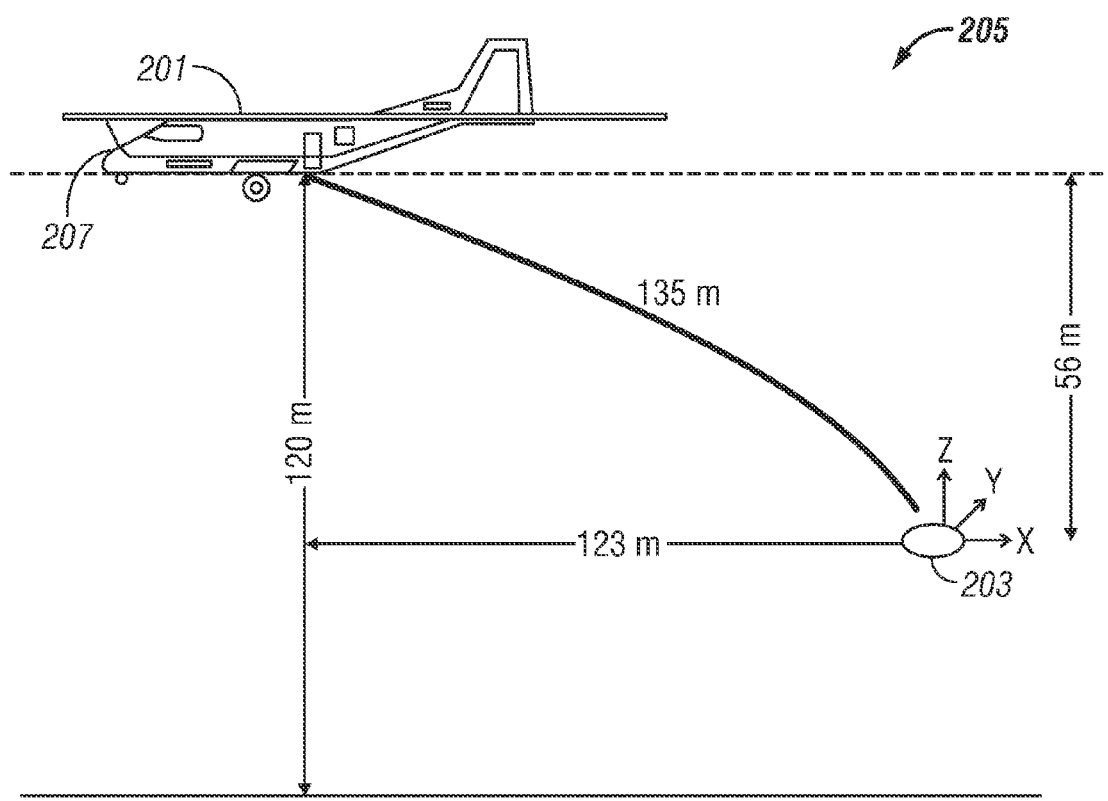
FIG. 3 (prior art) illustrates equipment used for multicomponent airborne electromagnetic measurements.

Determination of the error in the zz measurements involves rotating the tool shown in FIG. 3 by 90° about the tool axis, thus interchanging the x- and y-axis (with a sign reversal). We can then evaluate $$P_2 = \tilde{H}_{zz} + \tilde{H}_{xx} - \tilde{H}_{yy} \quad (20)$$
$$= H_{zz} + H_{xx} - H_{yy} + \delta_{zz} + \delta_{xx} - \delta_{yy}$$
$$= \delta_{zz} + \delta_{xx} - \delta_{yy}.$$

From eqns. (19) and (20), it follows that:

$$\frac{P_1 + P_2}{2} = \delta_{zz}. \quad (21)$$

Thus, if the quantity given by eqn. (21) is zero, then the zz component is properly calibrated.

Figure 5:
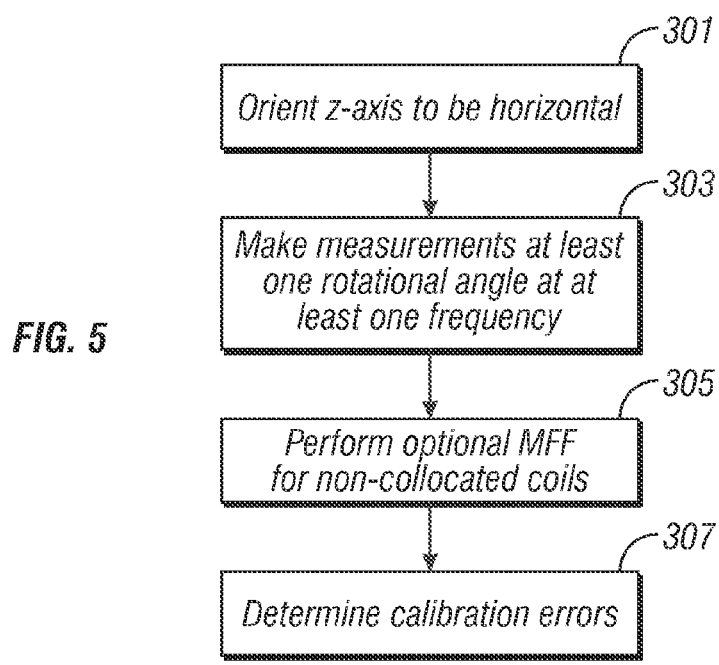
FIG. 5 is a flow chart of the method of the present invention.

Turning now to FIG. 5, a flow chart illustrating the method of the present invention is shown. The z-axis is of the tool (or the transmitter on the aircraft) is oriented parallel to the surface of the earth 301. Multicomponent measurements are made at one or more frequencies 303 at least one rotational angle. As noted above, for co-located transmitter (and receiver) coils, measurements at a single frequency are sufficient. For non co-located coils, multifrequency measurements may be made. As further noted above, at the very If the coils are not co-located, then a multifrequency focusing (MFF) is applied to the measurements 305. Next, calibration errors are determined 307. As noted above, this is done using eqns. (1)-(7). It is noted that even for an aeromagnetic system with only a single transmitter coil, some calibration information can be obtained using eqn. (3), so that the method of the invention can be practiced with a system having a single transmitter and a plurality of spaced-apart receivers.

Those versed in the art would recognize that the method described above could also be performed using two transmitters and a single receiver.

In another embodiment of the invention, the axes of the transmitters and receivers need not be in the x-, y-, and z-directions defined by the tool axis. It is sufficient for the purposes of the present invention that the coils be oriented such that by well known coordinate rotation methods, the x-, y-, and z-measurements relative to the axis be recoverable. The longitudinal axis of the tool should be oriented in a direction substantially parallel to the surface. We refer to the measurements made by the transmitters and receivers as being in the measurement coordinate system, and the rotated measurements as being in the tool coordinate system.

Another embodiment of the invention uses equation (7) with a known transmitter to receive a distance. Under these conditions, the invention may be practiced with a single transmitter and a single receiver.

The operation of the transmitter and receivers may be controlled by one or more processors. For wireline applications, the downhole processor and/or the surface processor may be used. Part of the processing may be done at a remote location away from the wellbore. Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

While the foregoing disclosure is directed to the preferred embodiments of the invention, various modifications will be apparent to those skilled in the art. It is intended that all variations within the scope of the appended claims be embraced by the foregoing disclosure.

What is claimed is:

1. A method of calibrating a system having a plurality of transmitters and a plurality of receivers for making multicomponent induction measurements, the method comprising:
positioning the system above the surface of the earth;
orienting the system so that an axis of one transmitter of the plurality of transmitters is substantially parallel to the surface of the earth and substantially collinear with an axis of one receiver of the plurality of receivers;
obtaining multicomponent measurements at at least one frequency and at least one rotational angle φ about a longitudinal axis of the system at a single height above the surface of the earth;
determining from only the multicomponent measurements made at the single height, without using a measurement from a height other than the single height, an indication of a calibration error in at least one of the multicomponent measurements; wherein the determining the indication of the calibration error comprises using a relation of the form:

$$H_{xx} = H_{yy} + H_{zz}$$

where $H_{xx}$, $H_{yy}$ and $H_{zz}$ are magnetic field measurements wherein the first subscript refers to a transmitter orientation, the second subscript refers to a receiver orientation and z is along the longitudinal axis of the system; and
recording the indication of the calibration error on a suitable medium.

2. The method of claim 1 wherein the plurality of transmitters further comprises three transmitters that are not at substantially a same position.

3. The method of claim 1 wherein the system is adapted for aerial use.

4. The method of claim 1 wherein the at least one rotational angle comprises angles of 0° and 90°.

5. The method of claim 1 wherein the determining the indication of the calibration error further comprises using a distance between one of the plurality of transmitters and one of the plurality of receivers.

6. A system comprising a plurality of transmitters and a plurality of receivers configured to make multicomponent induction measurements, the system comprising:
one transmitter of the plurality of transmitters positioned with its axis substantially horizontal and collinear with an axis of one of the plurality of receivers, the plurality of transmitters and receivers disposed on a tool and configured to make multicomponent measurements at at least one frequency and at least one rotational angle φ about a longitudinal axis of the tool at a single height above a surface of the earth;
a processor configured to determine from only the multicomponent measurements made at the single height, without using a measurement from a height other than the single height, with the system substantially parallel to the surface of the earth, an indication of a calibration error in at least one of the multicomponent measurements wherein the determining the indication of the calibration error comprises using a relation of the form:

$$H_{xx} = H_{yy} + H_{zz}$$

where $H_{xx}$, $H_{yy}$ and $H_{zz}$ magnetic field measurements wherein the first subscript refers to a transmitter orientation, the second subscript refers to a receiver orientation and z is along the longitudinal axis of the tool.

7. The system of claim 6 wherein the processor is further configured to determine the indication of the calibration error using a distance between one of the plurality of transmitters and one of the plurality of receivers.

8. The system of claim 6 wherein the plurality of transmitters further comprises three transmitters that are not at substantially a same position.

9. A non-transitory computer-readable medium product having stored thereon instructions that when read by a processor cause the processor to execute a method, the method comprising:

obtaining multicomponent measurements made at only a single height above the surface of the earth by a system that includes a plurality of transmitters and a plurality of receivers on a logging tool, the multicomponent measurements being made while an axis of one of the plurality of transmitters is oriented in a direction substantially parallel to the surface of the earth and collinear with an axis of one of the plurality of receivers, the multicomponent measurements being at at least one frequency and at least one rotational angle φ about a longitudinal axis of the logging tool at the single height above the surface of the earth, determining from only the multicomponent measurements made at the single height, without using a measurement from a height other than the single height, an indication of a calibration error in at least one of the multicomponent measurements;

wherein the determining the indication of the calibration error comprises a relation selected from:

(i) $H_{xx}=H_{yy}+H_{zz}$ where $H_{xx}$, $H_{yy}$ and $H_{zz}$ are magnetic field measurements wherein the first subscript refers to a transmitter orientation, the second subscript refers to a receiver orientation and z is along the longitudinal axis of the logging tool, and (ii) $\hat{\sigma}_{xy}=-\sigma_{zz} \sin 2\phi$ where the σ's are apparent conductivity values at the rotational angle φ about the longitudinal axis of the tool.

10. The non-transitory computer-readable medium product of claim 9 wherein the medium is selected from the group consisting of (i) a ROM, (ii) an EPROM, (iii) an EAROM, (iv) a Flash Memory, and, (v) an optical disk.

11. A system for making multicomponent induction measurements, the system comprising:

a plurality of transmitters and a plurality of receivers on a tool with at least one transmitter and at least one receiver on the tool positioned above a surface of the earth with a longitudinal axis of the tool substantially parallel to the surface of the earth, the plurality of transmitters and the plurality of receivers configured to make multicomponent measurements at at least one frequency and at least one rotational angle φ about the longitudinal axis of the tool at a single height above the surface of the earth; and a processor configured to:
(i) rotate the multicomponent measurements to give rotated components in a tool coordinate system, and
(ii) estimate from the multicomponent measurements made at a substantially horizontal configuration of the system at the single height, without using a measurement from a height other than the single height, an indication of a calibration error in at least one of the multicomponent measurements;

wherein the estimating the indication of the calibration error further comprises using a relation selected from: (i) $H_{xx}=H_{yy}+H_{zz}$ and (ii) $\hat{\sigma}_{xy}=-\sigma_{zz} \sin 2\phi$ where $H_{xx}$, $H_{yy}$ and $H_{zz}$ are magnetic field measurements wherein the first subscript refers to a transmitter orientation, the second subscript refers to a receiver orientation and z is along the longitudinal axis of the tool, and where the σ's are apparent conductivity values at the at least one rotational angle φ.

12. A method of calibrating a system having a plurality transmitters and a plurality of receivers configured to make multicomponent induction measurements, the method comprising:

positioning the system above the surface of the earth;

orienting the system so that an axis of one of the plurality of transmitters and an axis of one of the plurality of receivers are substantially collinear and substantially parallel to the surface of the earth;

obtaining multicomponent measurements at at least one frequency and at least one rotational angle φ about a longitudinal axis of the system at a single height above the surface of the earth;

determining from only the multicomponent measurements made at the single height, without using a measurement from a height other than the single height, an indication of a calibration error in at least one of the multicomponent measurements; wherein the determining the indication of the calibration error comprises using a relation of the form:

$\hat{\sigma}_{xy}=-\sigma_{zz} \sin 2\phi$ where the σ's are apparent conductivity values at the at least one rotational angle φ and wherein the first subscript refers to a transmitter orientation and the second subscript refers to a receiver orientation and wherein z is along the longitudinal axis of the system; and recording the indication of the calibration error on a suitable medium.

13. A system for making multicomponent induction measurements, the system comprising:

a plurality of tri-axial transmitters and a plurality of tri-axial receivers on a tool configured to make multicomponent induction measurements at a plurality of rotational angles about a longitudinal axis of the tool, the tool being positioned so that an axis of one of the plurality of transmitters is substantially collinear with an axis of one of the plurality of receivers and is substantially parallel to the surface of the earth at a single height above the surface of the earth; and a processor configured to determine from only the multicomponent measurements made at the single height, without using a measurement from a height other than the single height, an indication of a calibration error in at least one of the multicomponent measurements, wherein the determining the indication of the calibration error comprises using a relation of the form:

$\hat{\sigma}_{xy}=-\sigma_{zz} \sin 2\phi$ where the σ's are apparent conductivity values at at least one rotational angle φ of the plurality of rotational angles and wherein the first subscript refers to a transmitter orientation and the second subscript refers to a receiver orientation, and z is along the longitudinal axis of the tool.

* * * * *